(12) United States Patent
Brackley et al.

(10) Patent No.: US 9,278,878 B2
(45) Date of Patent: Mar. 8, 2016

(54) METHODS AND APPARATUS FOR SCORING THIN GLASS

(75) Inventors: Douglas Edward Brackley, Horseheads, NY (US); Frank Thomas Coppola, Horseheads, NY (US); Monica Jo Mashewske, Horseheads, NY (US); David Alan Tammaro, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 274 days.

(21) Appl. No.: 13/398,033

(22) Filed: Feb. 16, 2012

(65) Prior Publication Data

US 2012/0210842 A1   Aug. 23, 2012

Related U.S. Application Data

(60) Provisional application No. 61/445,730, filed on Feb. 23, 2011.

(51) Int. Cl.
*B26D 7/08* (2006.01)
*C03B 33/10* (2006.01)
(Continued)

(52) U.S. Cl.
CPC ............... *C03B 33/107* (2013.01); *B26D 7/08* (2013.01); *B26D 7/088* (2013.01); *C03B 33/02* (2013.01); *C03B 33/0207* (2013.01); *C03B 33/0215* (2013.01); *C03B 33/0235* (2013.01); *C03B 33/03* (2013.01); *Y10T 83/0333* (2015.04); *Y10T 83/0341* (2015.04); *Y10T 83/0385* (2015.04)

(58) Field of Classification Search
CPC ....... C03B 33/02; C03B 33/0207; B26D 7/08

USPC .............. 83/879–887, 168; 65/105, 174
See application file for complete search history.

(56) References Cited

U.S. PATENT DOCUMENTS 3,592,370 A     7/1971   Boardman ............ 225/2
3,983,771 A *  10/1976   Bonaddio ............ 83/884
(Continued)

FOREIGN PATENT DOCUMENTS

CN    201241007        5/2009
CN    202729995 U      2/2013
(Continued)

OTHER PUBLICATIONS

State Intellectual Property Office of the People's Republic of China; First Office Action; Feb. 8, 2014; pp. 1-3.

*Primary Examiner* — Omar Flores Sanchez
(74) *Attorney, Agent, or Firm* — Jeffrey A. Schmidt; Maurice M. Klee

(57) ABSTRACT

A method and apparatus for forming vents (13) in glass sheets (10). The method includes repetitively performing the steps of: (I) bringing a score head (21) and a platen (31) into contact with, respectively, the front (11) and rear (12) major surfaces of the glass sheet (10), (II) moving the score head (21) across the front major surface (11) along a predetermined path to form a vent (13), and (III) withdrawing the score head (21) and the platen (31) from the front (11) and rear (12) major surfaces, wherein: (i) the thickness ($\delta$) of the glass sheet is less than or equal to 500 microns, and (ii) for each repetition of steps (I) through (III), the platen (31) is cleaned after step (III) and before step (I) to remove glass chips which if left on the platen (31) could cause the score head (21) to penetrate through the thickness $\delta$.

20 Claims, 17 Drawing Sheets

(51) Int. Cl.
  *C03B 33/02* (2006.01)
  *C03B 33/023* (2006.01)
  *C03B 33/03* (2006.01)

(56) References Cited

U.S. PATENT DOCUMENTS

| | | | | |
|---|---|---|---|---|
| 4,175,684 | A * | 11/1979 | Butler | 225/2 |
| 4,512,226 | A | 4/1985 | Juckett | 83/56 |
| 6,463,762 | B1 | 10/2002 | Ross, Jr. | 65/105 |
| 6,536,121 | B1 * | 3/2003 | Ishikawa et al. | 33/18.1 |
| 6,616,025 | B1 | 9/2003 | Andrewlavage, Jr. | 225/96.5 |
| 7,359,764 | B2 * | 4/2008 | Bonaddio et al. | 700/193 |
| 8,292,141 | B2 * | 10/2012 | Cox et al. | 225/2 |
| 2004/0115522 | A1 | 6/2004 | Urso et al. | |
| 2004/0154456 | A1 * | 8/2004 | Wakayama et al. | 83/880 |
| 2006/0255083 | A1 * | 11/2006 | Bonaddio et al. | 225/2 |
| 2007/0039990 | A1 * | 2/2007 | Kemmerer et al. | 225/2 |
| 2008/0276646 | A1 | 11/2008 | Chalk et al. | 65/17.2 |
| 2009/0250497 | A1 | 10/2009 | Cox et al. | 225/2 |
| 2012/0132053 | A1 * | 5/2012 | Matthews et al. | 83/879 |
| 2013/0104720 | A1 * | 5/2013 | Parker | 83/880 |

FOREIGN PATENT DOCUMENTS

| | | |
|---|---|---|
| JP | 200799563 A | 4/2007 |
| KR | 20020004567 A | 1/2002 |
| WO | 2006/124459 | 11/2006 |
| WO | 2008/005250 | 1/2008 |

* cited by examiner

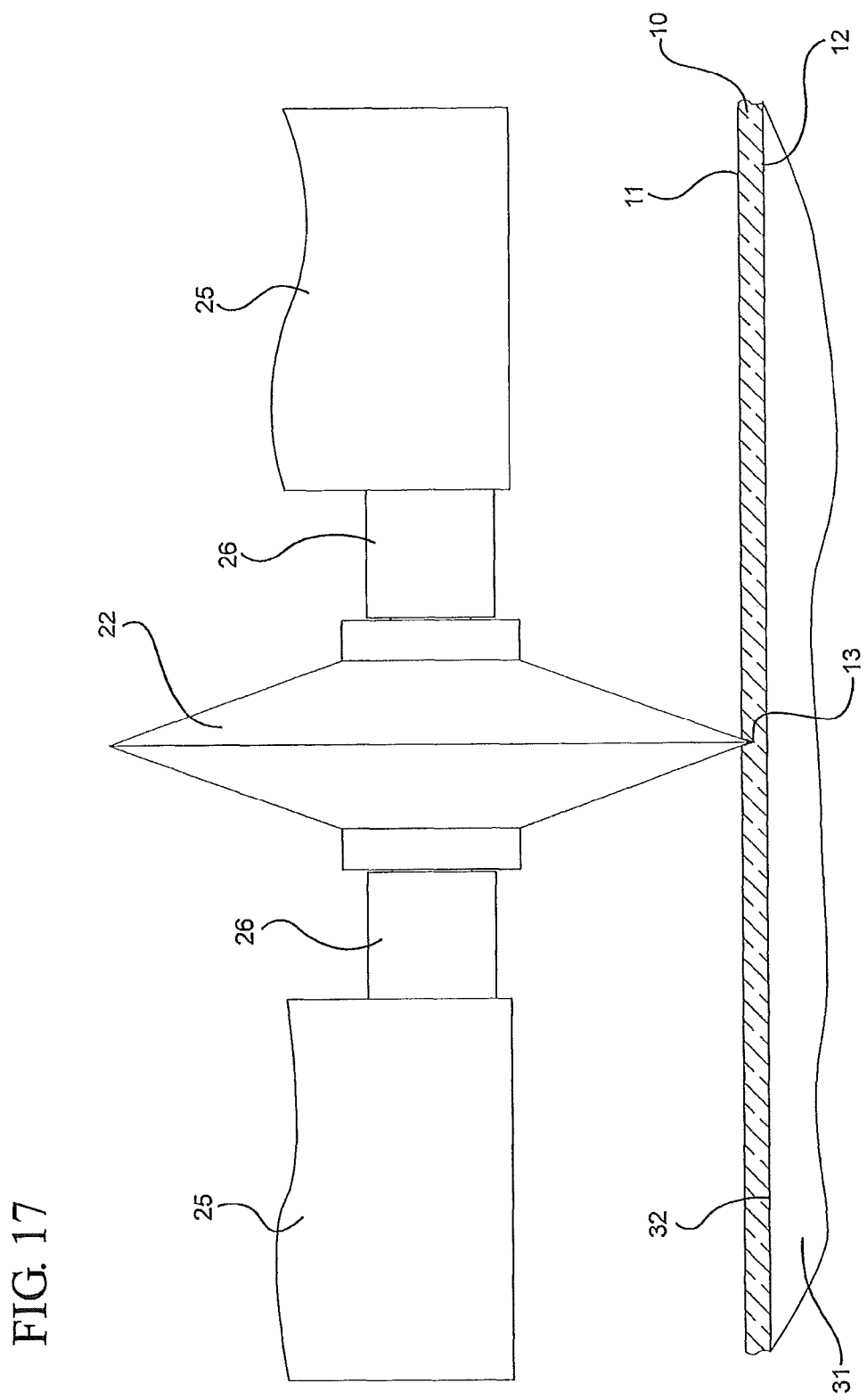

METHODS AND APPARATUS FOR SCORING THIN GLASS

This application claims the benefit of priority under 35 USC §119 of U.S. Provisional Application Ser. No. 61/445,730 filed on Feb. 23, 2011, the content of which is relied upon and incorporated herein by reference in its entirety.

FIELD

This disclosure relates to mechanical scoring of thin glass, i.e., glass having a thickness that is equal to or less than 500 microns. As discussed fully below, during mechanical scoring, thin glass behaves differently than thick glass and thus presents problems not encountered during thick glass scoring. The need to score thin glass repetitively and reliably is of growing importance as thin glass becomes more widely used in connection with mobile (e.g., handheld) electronic devices.

DEFINITIONS

As used herein and in the claims, the phrases "glass sheet" and "glass sheets" include glass ribbons and individual glass sheets (also referred to in the art as "glass panes" or simply as "panes"). The phrases also include ribbons and individual glass sheets composed of (i) glass or (ii) glass-ceramics.

BACKGROUND

Glass scoring is one of the fundamental processes in the manufacture of sheet glass. It is used to form a "vent" in the glass surface which extends partially, but not completely, through the thickness of the glass. Once formed, the vent functions as a separation line for controlled separation of the glass into two pieces by applying a bending moment or other mechanical force to the glass at the vent.

Mechanical scoring is used at various points in the glass manufacturing process. For example, it is used during the initial separation of individual glass sheets from a moving glass ribbon. It is also used during trimming of individual glass sheets to desired dimensions, as well as in the division of large glass sheets into smaller sub-pieces.

FIG. 1 shows the basic components of an automated mechanical scoring system. In this figure, 100 is a glass sheet (e.g., a moving glass ribbon), 20 is a scoring assembly having a scoring head 21, and 30 is a platen assembly which includes a platen 31. During scoring, the scoring head (e.g., a scoring wheel or a scoring point) is moved across a major surface of the glass sheet (referred to herein as the "front surface") along a predetermined path to form the desired vent. To support the glass during this process, the platen (i.e., a compliant platen in the prior art) is brought into contact with the opposite surface of the glass sheet (referred to herein as the "rear surface"). Examples of such platens (also known as "nosings") can be found in commonly-assigned U.S. Patent Application Publications Nos. US2008/0276646 and US 2009/250497A1, the contents of which in their entireties are incorporated herein by reference.

In the past, the use of a compliant platen to support the rear surface of a glass sheet during mechanical scoring has worked successfully with glass sheets having thicknesses above 500 microns, e.g., glass sheets having a thickness of 700 microns as used as substrates in the manufacture of liquid crystal displays. However, as detailed below, in accordance with the present disclosure, it has been found that the compliant platens used with thick glass do not work successfully with thin glass, i.e., glass having a thickness that is less than or equal to 500 microns. In particular, it has been found that the combination of a thin glass sheet and a compliant platen (i.e., a platen having a compliant glass-engaging surface) leads to unreliable scoring. In accordance with one of its aspects, the present disclosure addresses this problem.

In addition to the problem with compliant platens, it has also been found that when mechanical scoring is used repetitively with thin glass, e.g., in connection with the separation of individual glass sheets from a glass ribbon, rather than producing a vent as desired, the process results in cracking of the glass at the location of the score head in an uncontrolled manner. Moreover, the percentage of cracked sheets grows as the process is continued, i.e., the process enters into a "death spiral."

In accordance with another aspect, the present disclosure addresses this problem of uncontrolled cracking during the mechanical scoring of thin glass sheets. It both identifies the source of the problem and provides effective solutions to the problem that can be readily implemented in, for example, the context of an existing mechanical scoring process.

SUMMARY

In accordance with a first aspect, a method is disclosed for forming vents (13) in one or more glass sheets (10), each of which has a front major surface (11), a rear major surface (12), and a thickness δ, the method including repetitively:
  (I) bringing a score head (21) and a platen (31) into contact with, respectively, the front (11) and rear (12) major surfaces;
  (II) moving the score head (21) across the front major surface (11) along a predetermined path to form the vent (13), the platen (31) serving as an anvil for the score head (21) during the formation of the vent (13); and
  (III) withdrawing the score head (21) and the platen (31) from, respectively, the front (11) and rear (12) major surfaces;
  wherein:
  (a) the thickness δ is less than or equal to 500 microns (e.g., less than or equal to 350 microns), and
  (b) for each repetition of steps (I) through (III), the platen (31) is cleaned after step (III) and before step (I) to remove glass chips which if left on the platen (31) could cause the score head (21) to penetrate through the thickness δ.

According to a second aspect, there is provided the method of Aspect 1 wherein the thickness δ is less than or equal to 350 microns.

According to a third aspect, there is provided the method of Aspect 1 or Aspect 2 wherein the one or more glass sheets comprises:
  (i) a glass ribbon and the repetition of steps (I) through (III) is performed in connection with the separation of individual glass sheets from the ribbon; or
  (ii) an individual glass sheet and the repetition of steps (I) through (III) is performed in connection with the formation of a plurality of vents in the individual glass sheet; or
  (iii) a series of individual glass sheets and the repetition of steps (I) through (III) is performed in connection with the formation of a vent in each of the individual glass sheets in the series.

According to a fourth aspect, there is provided the method of any one of Aspects 1-3 wherein the platen has a first end and a second end and the cleaning of the platen alternates between cleaning from the first end towards the second end and cleaning from the second end towards the first end.

According to a fifth aspect, there is provided the method of any one of Aspects 1-4 wherein the cleaning comprises contacting the platen with a rotating brush.

According to a sixth aspect, there is provided the method of Aspect 5 wherein the cleaning comprises applying a vacuum to collect glass chips freed from the platen by the brush.

According to a seventh aspect, there is provided the method of Aspect 5 wherein after step (III), the brush moves to a position where it engages the platen and before step (I), the brush moves to a position where it is out of engagement with the platen and will not interfere with steps (I) through (III).

According to an eighth aspect, there is provided the method of any one of Aspects 1-7 wherein at least the portion of the platen that engages the rear major surfaces of the glass sheets is made of steel and has a Rockwell hardness equal to or greater than 20.

In accordance with a ninth aspect, an apparatus is disclosed for forming a vent (13) in a glass sheet (10) which has front (11) and rear (12) major surfaces, the apparatus including:

(I) a scoring assembly (20) having a score head (21), the score head (21) having a rest state and an operative state in which, during use of the apparatus, the score head (21) contacts the front major surface (11) of the glass sheet (10) and forms a vent (13) in that surface along a predetermined path;

(II) a platen assembly (30) having a platen (31) having a non-compliant, glass-engaging surface (32), the platen (31) having a rest state and an operative state in which, during use of the apparatus, the platen's non-compliant, glass-engaging surface (32) contacts the rear major surface (12) of the glass sheet (10) and serves as an anvil for the score head (21) during the formation of the vent (13);

(III) a cleaning assembly (40) having a wiper (41), the wiper (41) having a rest state and an operative state in which, during use of the apparatus, the wiper (41) contacts the non-compliant, glass-engaging surface (32) of the platen (31) and moves along that surface to remove glass chips (14) that may be present on the surface; and (IV) a controller (50) connected to the scoring, platen, and cleaning assemblies (20,30,40) which during use of the apparatus:

(A) transfers the score head (21) and the platen (31) from their rest states to their operative states to form the vent (13); and (B) once a vent (13) has been formed:
 (i) transfers the score head (21) and the platen (31) from their operative states to their rest states; and
 (ii) transfers the wiper (41) from its rest state to its operative state and back to its rest state.

According to a tenth aspect, there is provided the apparatus of Aspect 9 wherein:

(i) the platen has a first end and a second end;

(ii) the wiper's rest state comprises a first rest position and a second rest position, the first rest position being associated with the first end of the platen and the second rest position being associated with the second end of the platen, the wiper being in its rest state when it is at either the first position or the second position; and (iii) the controller's transfer of the wiper from its rest state to its operative state and back to its rest state during use of the apparatus comprises either transferring the wiper from its first rest position to its operative state to its second rest position or transferring the wiper from its second rest position to its operative state to its first rest position.

According to an eleventh aspect, there is provided the apparatus of Aspect 10 wherein during use of the apparatus, the controller alternates between transferring the wiper from its first rest position to its operative state to its second rest position and transferring the wiper from its second rest position to its operative state to its first rest position.

According to a twelfth aspect, there is provided the apparatus of any one of Aspects 9-11 wherein the score head comprises a scoring wheel or a scoring point.

According to a thirteenth aspect, there is provided the apparatus of any one of Aspects 9-12 wherein the platen's non-compliant, glass-engaging surface is made of steel and has a Rockwell hardness equal to or greater than 20.

According to a fourteenth aspect, there is provided the apparatus of any one of Aspects 9-13 wherein the wiper is a pad.

According to a fifteenth aspect, there is provided the apparatus of any one of Aspects 9-13 wherein the wiper is a rotating brush.

According to a sixteenth aspect, there is provided the apparatus of Aspect 15 wherein the motion of the platen between its rest and operative states defines a plane and the rotating brush has an axle which is moveable between a first position where the axle is parallel to the plane and a second position where the axle is perpendicular to the plane, the rotating brush being, respectively, in its rest and operative states when the axle is in its first and second positions.

In accordance with a seventeenth aspect, apparatus is disclosed for use in forming a vent (13) in a glass sheet (10) including:

(I) a platen (31) having a non-compliant surface (32) which, during use of the apparatus, contacts a major surface (12) of the glass sheet (10) and serves as an anvil for a score head (21) which forms a vent (13) in the glass sheet (10);

(II) a transport assembly (36) for the platen (31) which, during use of the apparatus, moves the platen (31) in a platen-plane-of-motion between a rest state and an operative state; and (III) a platen cleaning assembly (40) which includes:
 (a) a wiper (41) which has a rest state and an operative state, the wiper (41) being out of the platen-plane-of-motion when the wiper (41) is in its rest state and intersecting the platen-plane-of-motion when the wiper (41) is in its operative state;
 (b) a transfer assembly (43) which, during use of the apparatus, transfers the wiper (41) between its rest and operative states; and
 (c) a transport assembly (44) which, during use of the apparatus, moves the wiper (41) along the platen (31) to remove glass chips (14) that may be present on the surface (32) of the platen (31).

According to an eighteenth aspect, there is provided the apparatus of Aspect 17 wherein the wiper is a pad.

According to a nineteenth aspect, there is provided the apparatus of Aspect 17 wherein the wiper is a rotating brush.

According to a twentieth aspect, there is provided the apparatus of any one of Aspects 17-19 wherein the non-compliant surface is made of steel and has a Rockwell hardness equal to or greater than 20.

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 17 is a schematic diagram illustrating successful scoring of a thin glass sheet without uncontrolled cracking after glass chips have been cleaned from the glass-engaging surface of a platen.

The foregoing drawings are not to scale.

DETAILED DESCRIPTION

As discussed above, the present disclosure is concerned with the problems of unreliable mechanical scoring of thin glass sheets and uncontrolled cracking during such scoring.

The unreliable scoring arises from the fact that compared to thick glass sheets, thin glass sheets tend to be less flat (e.g., more wavy), especially as the overall size of the sheet increases. Accordingly, the engagement of the scoring head with the front surface of a thin glass sheet can vary along the length of the score, e.g., there can be regions where the vent is too deep, too shallow, or even skipped regions where the scoring head fails to produce any vent. In accordance with the present disclosure, this problem is addressed by using a non-compliant platen which allows the score head to "iron out" the waviness of the thin glass sheet.

In particular, it was found that while successful mechanical scoring of thick sheets can be performed with platens having glass-engaging surfaces composed of various compliant polymers, when the same types of polymers are used with thin glass, the scoring becomes unreliable. Reliability is restored by increasing the hardness of the platen's glass-engaging surface. For example, high performance polymers, such as polyether ether ketone (PEEK) polymers, can be used for the platen's glass-engaging surface. A steel glass-engaging surface can be particularly effective because steel tends to shed glass chips. When steel is used, the hardness of the glass-engaging surface can be greater than or equal to Rockwell C20 (HRC 20) for glass having a thickness of approximately 400-500 microns or greater than or equal to Rockwell C60 (HRC 60) for glass having a thickness of 100 microns or less, with intermediate hardness values being used for thicknesses between 100 and 400 microns. Rockwell C60 steel can be used for all glass thicknesses if desired. As will be understood, PEEK and steel are two examples of suitable materials and other non-compliant materials can be used as the platen's glass-engaging surface if desired.

With regard to uncontrolled cracking (breaking or shattering) of the glass sheet, it has been discovered that a primary source of scoring failure for thin glass sheets is the presence of glass chips on the platen's glass-engaging surface. The use of a non-compliant glass-engaging surface of the type described above exacerbates the chip problem, but at bottom, it is the presence of chips in combination with the mechanical properties of thin glass sheets that leads to catastrophic failure of conventional mechanical scoring processes when applied to thin glass sheets.

Figure 1:
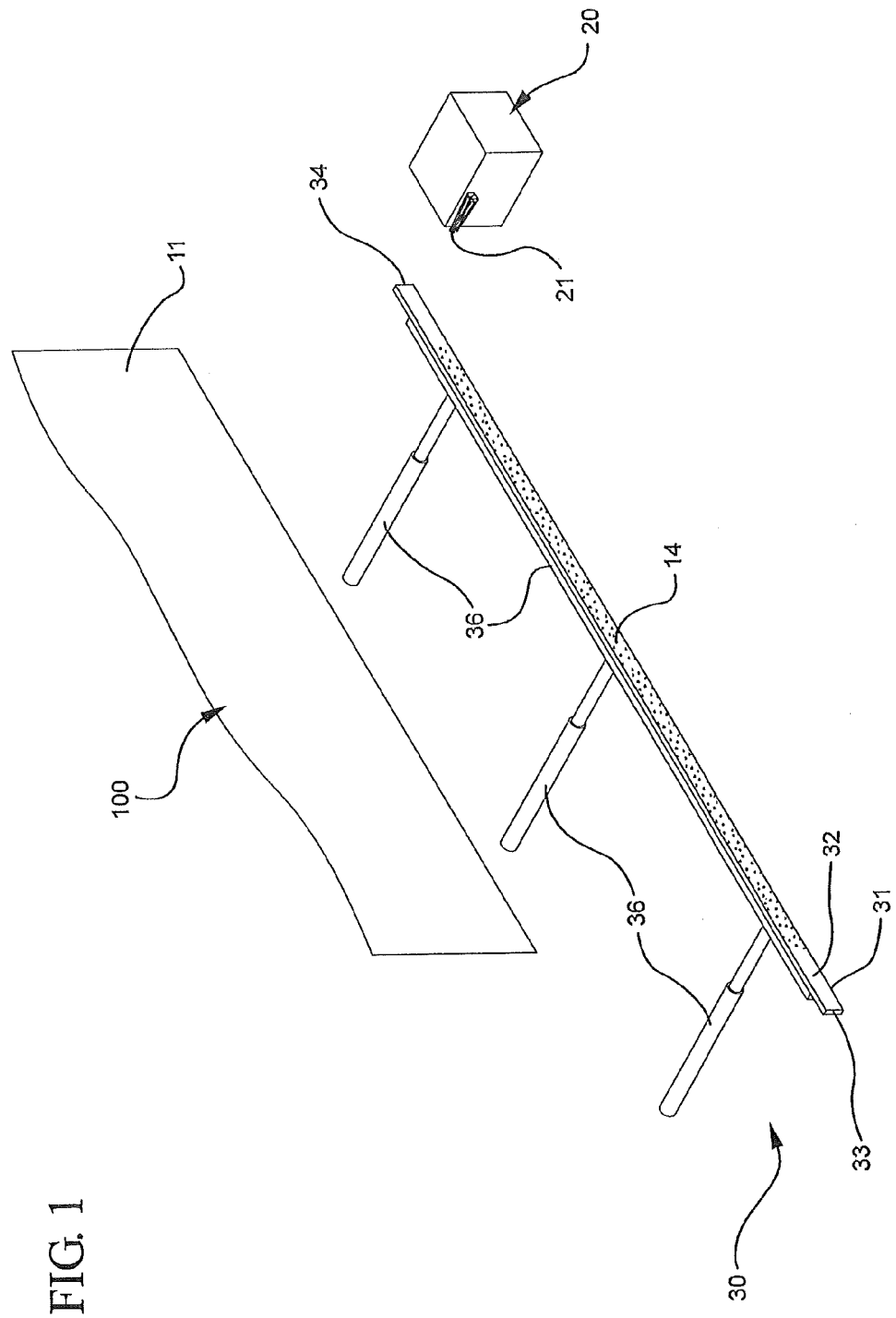
FIG. 1 is a schematic diagram showing the basic elements of an automated glass scoring system.
Figure 2:
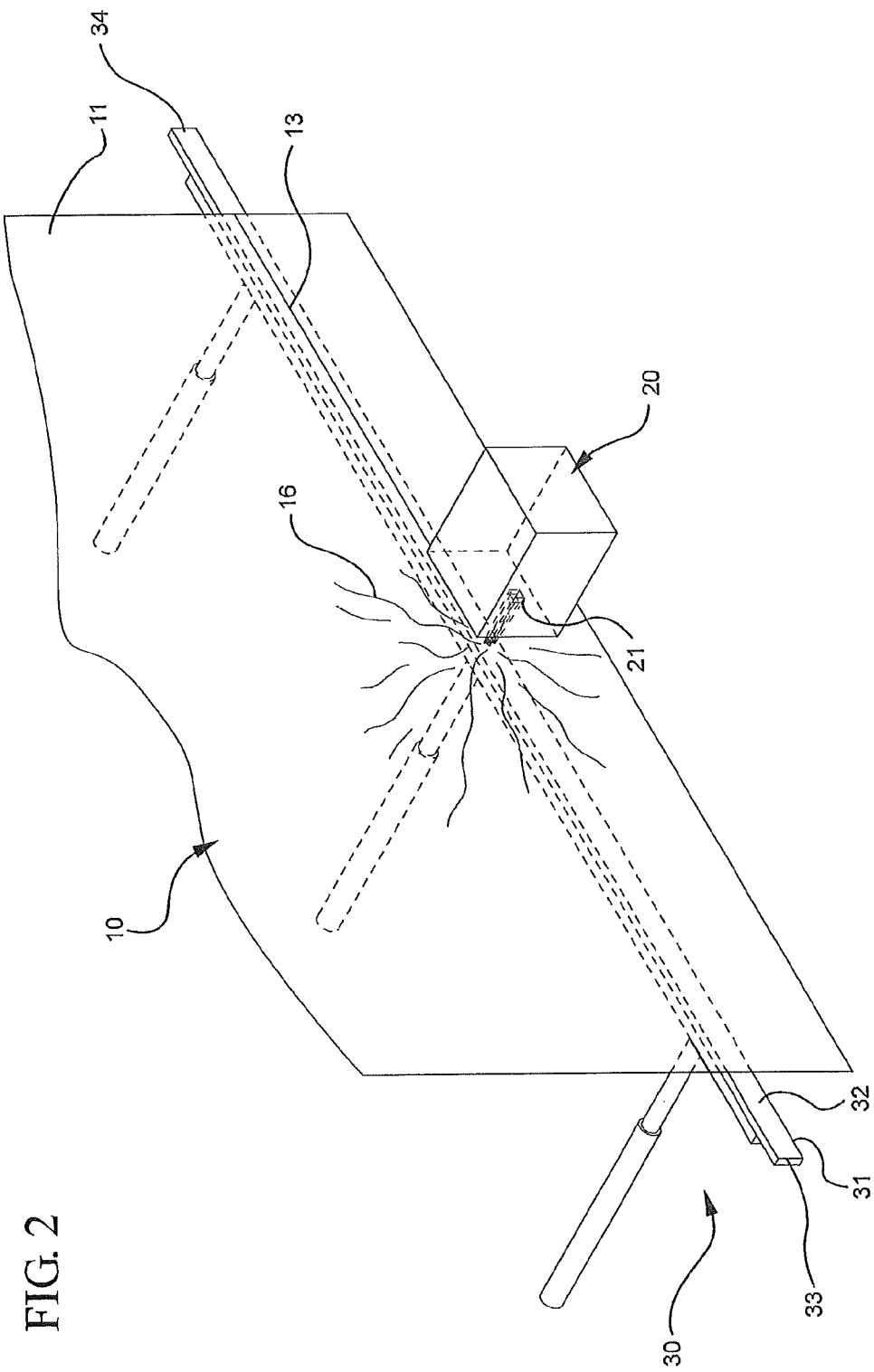
FIG. 2 is a schematic diagram illustrating the uncontrolled cracking of a thin glass sheet because of the presence of a glass chip on the glass-engaging surface of a platen.

FIGS. 2-6 illustrate the problem and its source. In particular, FIG. 2 illustrates uncontrolled cracking 16 of a thin glass sheet 10 during mechanical scoring as scoring assembly 20 moves across the sheet's front major surface 11. This type of cracking is referred to as "uncontrolled" to distinguish it from the controlled cracking (controlled breaking) that takes place at a completed vent during separation of a glass sheet into two pieces, e.g., the controlled cracking that takes place at the vent when an individual glass pane is separated from a ribbon by rotation of the pane about an axis through the vent. See, for example, commonly-assigned U.S. Pat. No. 6,616,025, the contents of which are incorporated herein by reference in their entirety.

Figure 3:
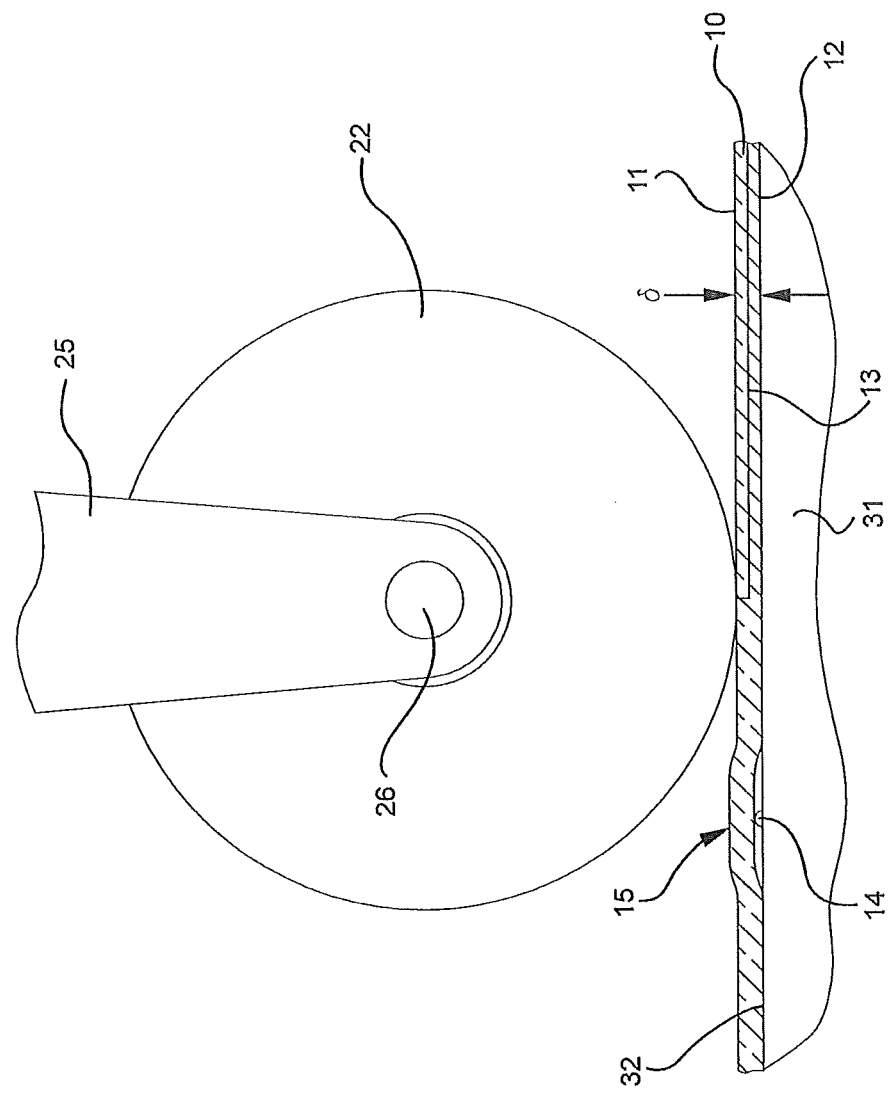
FIG. 3 is a schematic diagram illustrating the approach of a scoring wheel to a raised portion of a thin glass sheet, the raised portion being produced by a glass chip on the surface of a platen.
Figure 4:
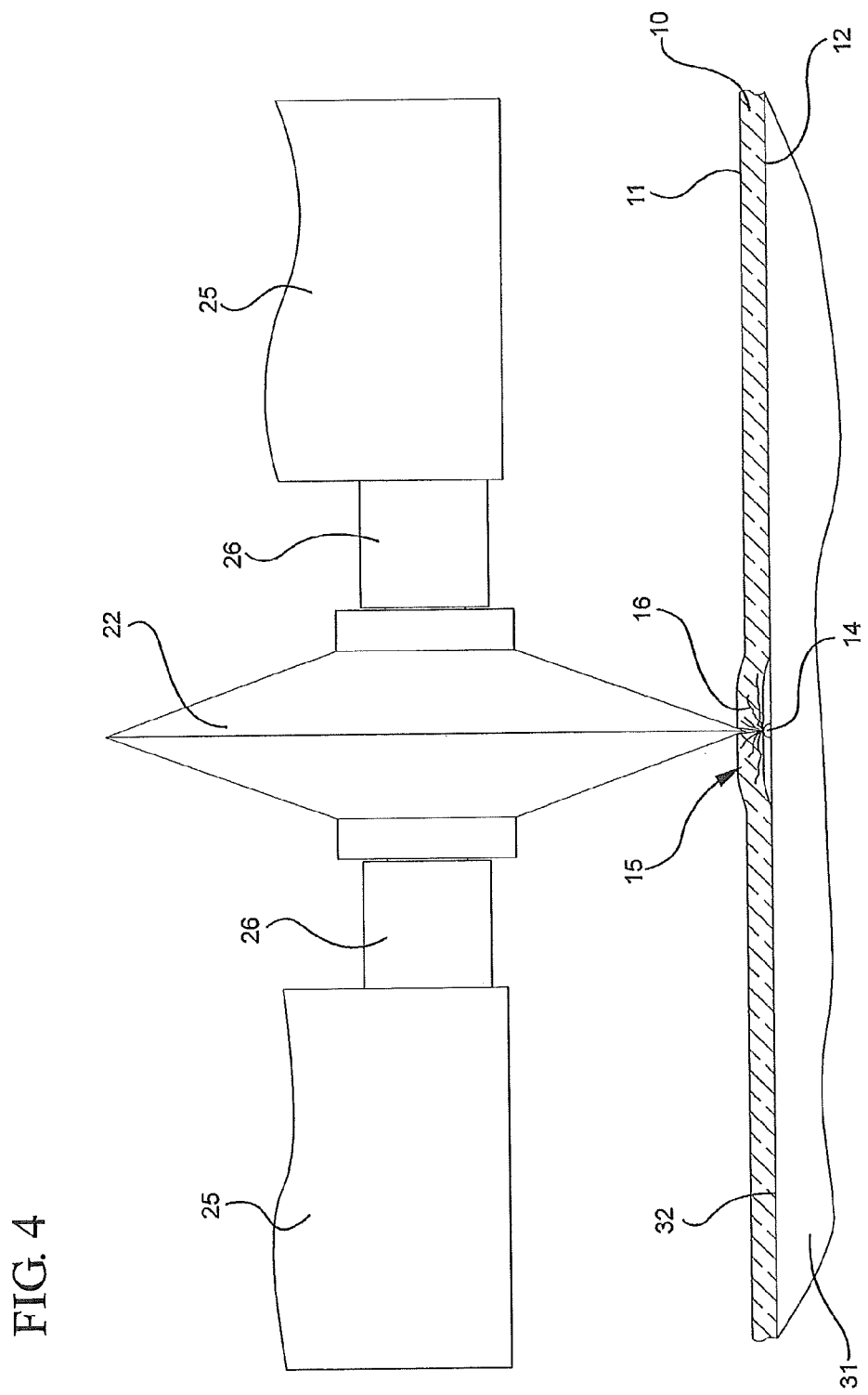
FIG. 4 is a schematic diagram illustrating penetration of a scoring wheel through a thin glass sheet as a result of the presence of a glass chip on the surface of a platen.

The origin of the uncontrolled cracking is shown in FIGS. 3 and 4, where FIG. 3 shows a scoring wheel 22 approaching a glass chip 14 on the glass-engaging surface 32 of a platen 31, e.g., a non-compliant glass-engaging surface of the type described above. Overlying the glass chip is thin glass sheet 10. As can be seen, because the glass is thin and thus at least somewhat pliable, the presence of the glass chip can produce a raised portion (raised mound) 15 in the glass sheet. FIG. 4 shows the effect of this raised portion, namely, breakthrough of the scoring wheel through the thin glass sheet. This breakthrough results in the uncontrolled cracking 16 shown in this figure and in FIG. 2. In some cases, the risk of uncontrolled cracking can arise from the size of the glass chip versus the thickness of the glass sheet, e.g., the chip can be on the order of ⅓ or more of the glass' thickness, in which case penetration of the glass sheet by a score head in the vicinity of the chip becomes highly likely even if no mound is formed. In contrast, thick glass sheets are sufficiently stiff to produce only small ramps at the locations of glass chips, especially when the platen's glass-engaging surface is compliant. Such small ramps only rarely result in breakthrough and its associated uncontrolled cracking.

Figure 5:
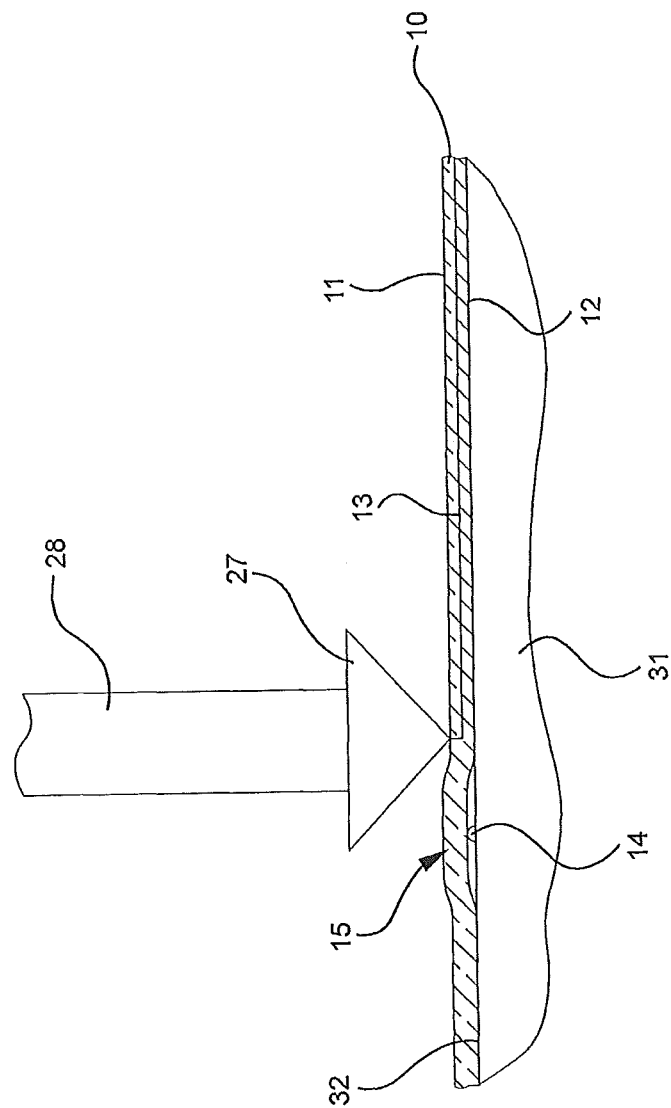
FIG. 5 is a schematic diagram illustrating the approach of a scoring point to a raised portion of a thin glass sheet, the raised portion being produced by a glass chip on the surface of a platen.
Figure 6:
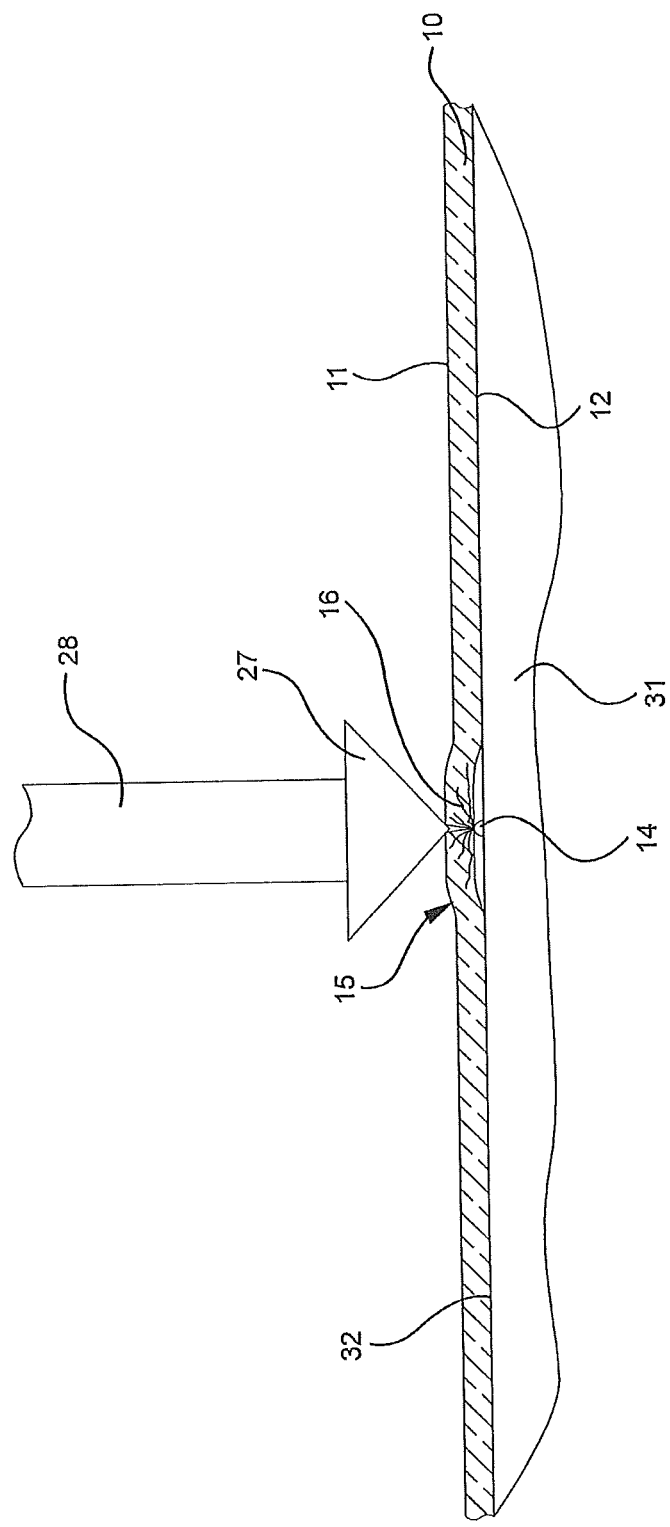
FIG. 6 is a schematic diagram illustrating penetration of a scoring point through a thin glass sheet as a result of the presence of a glass chip on the surface of a platen.

FIGS. 5 and 6 show the corresponding behavior when a scoring point 27 (e.g., a point diamond) is used instead of a scoring wheel. Again, the presence of the glass chip produces a raised mound in the thin, and thus flexible, glass sheet, and as with the scoring wheel, when the scoring point engages the mound it breaks through the entire thickness of the glass, thus producing uncontrolled cracking 16. It should be noted that neither the scoring wheel nor the scoring point needs to hit the glass chip straight on to produce uncontrolled cracking. Rather, contact with parts of the raised mound spaced from the glass chip can result in this failure mode.

Insidiously, the problems caused by glass chips during the scoring of thin glass sheets builds on itself In a glass manufacturing plant, some level of glass chips is always present, but it is generally low enough not to interfere with successful scoring of thick glass sheets. Thin glass sheets, however, have been found to be highly susceptible to scoring failure in accordance with the mechanism of FIGS. 2-6. The insidious aspect of uncontrolled cracking is that the cracking produces more glass chips. Glass chips tend to adhere to surfaces, including the glass-engaging surface of a platen, through, for example, static electricity effects. Thus, once mechanical scoring of the thin glass sheets begins to fail as a result of the glass chip mechanism, the problem will only get worse as more chips are generated thus increasing the probability that a raised mound of thin glass will be contacted by the scoring head. The process thus becomes a "death spiral" with each failure increasing the probability for more failures.

With the problem and its source thus identified, the present disclosure addresses the problem by linking a platen-cleaning cycle to the scoring process. Because of the insidious nature of the uncontrolled cracking problem, in certain embodiments, the platen-cleaning cycle is performed repetitively in synchrony with the scoring process. For example, platen cleaning can be performed after each vent is formed and before the score head again engages the front surface of a glass sheet to produce a new vent. Although in theory skipping of some scoring cycles is possible, in practice, such skipping represents a non-justifiable risk to a stable manufacturing process and thus should be avoided.

Figure 7:
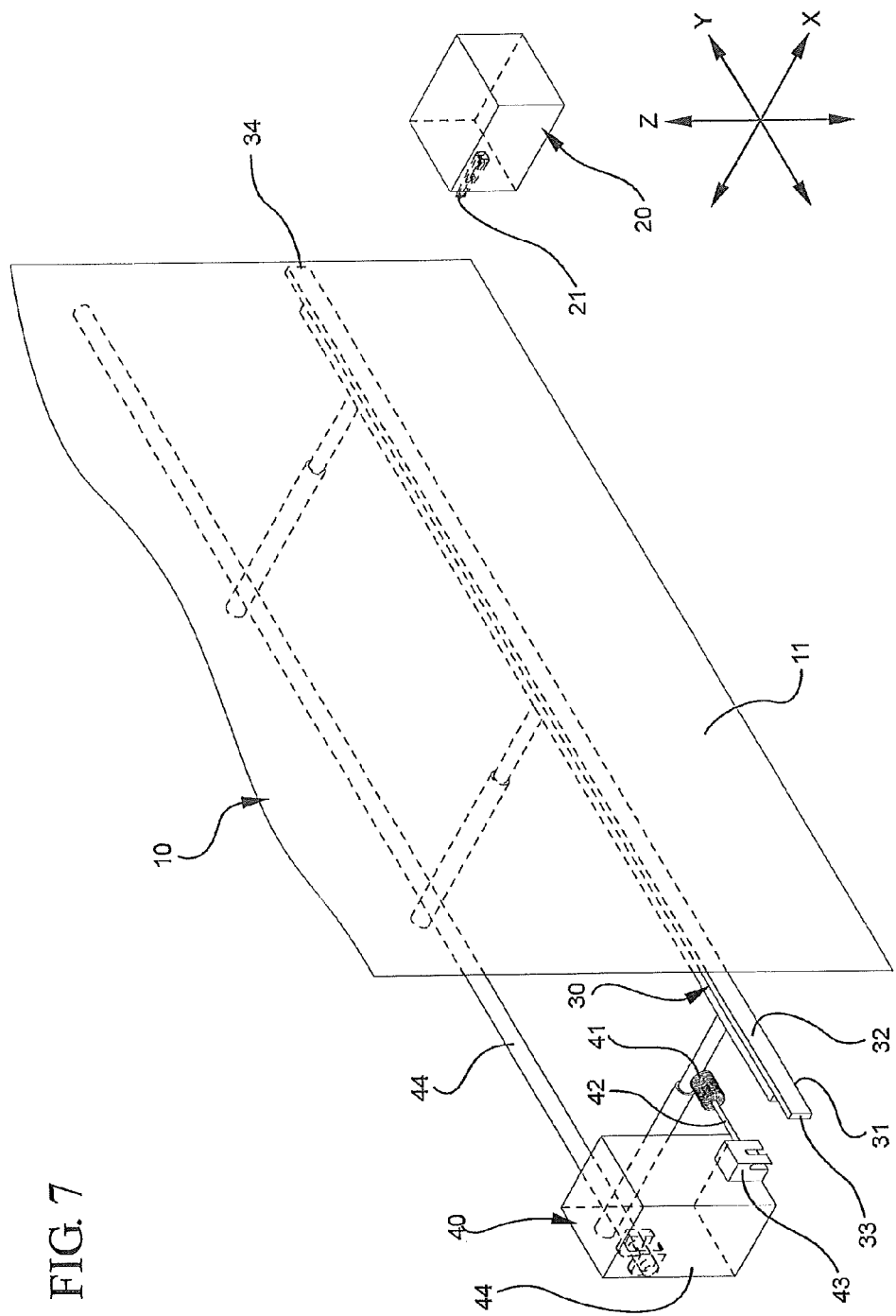
FIG. 7 is a schematic diagram showing the rest state of a thin glass scoring system of an embodiment of the present disclosure.

Equipment of various types can be used to perform the cleaning. In the embodiment of FIGS. 7-16, the platen-cleaning system has a construction that facilities its integration with an automated scoring system, e.g., as a retrofit to an existing glass scoring system. FIG. 7 shows the major components of the overall system, namely, scoring assembly 20 which includes score head 21, platen assembly 30 which includes platen 31 having glass-engaging surface 32 and first and second ends 33,34, and platen cleaning assembly 40 which includes transfer and transport assemblies 43 and 44 for wiper 41.

For ease of presentation, the main moveable components of the scoring, platen, and platen cleaning assemblies are shown in FIGS. 7-16, it being understood that these assemblies can include other moveable components, as well as components which remain stationary during a scoring cycle. Likewise, the motions shown in FIGS. 7-16 are merely representative of the types of motions that can be used in the practice of the present disclosure. To simplify the terminology, the following discussion refers to motions of the scoring, platen, and platen cleaning assemblies, it being understood that this does not mean that the entire assemblies need to move, but just the parts involved in achieving the assemblies' functions.

FIG. 7 shows the system in its full rest state, i.e., platen assembly 30, scoring assembly 20, and cleaning assembly 40 are each in their respective rest states. As will be discussed more fully below, in the embodiment of FIGS. 7-16, the rest state of the moveable portion of cleaning assembly 40 includes two rest positions, one associated with the first end 33 of platen 31 (e.g., the rest position illustrated in FIG. 7) and the other associated with the platen's second end 34 (e.g., the rest position illustrated in FIG. 15).

Figure 8:
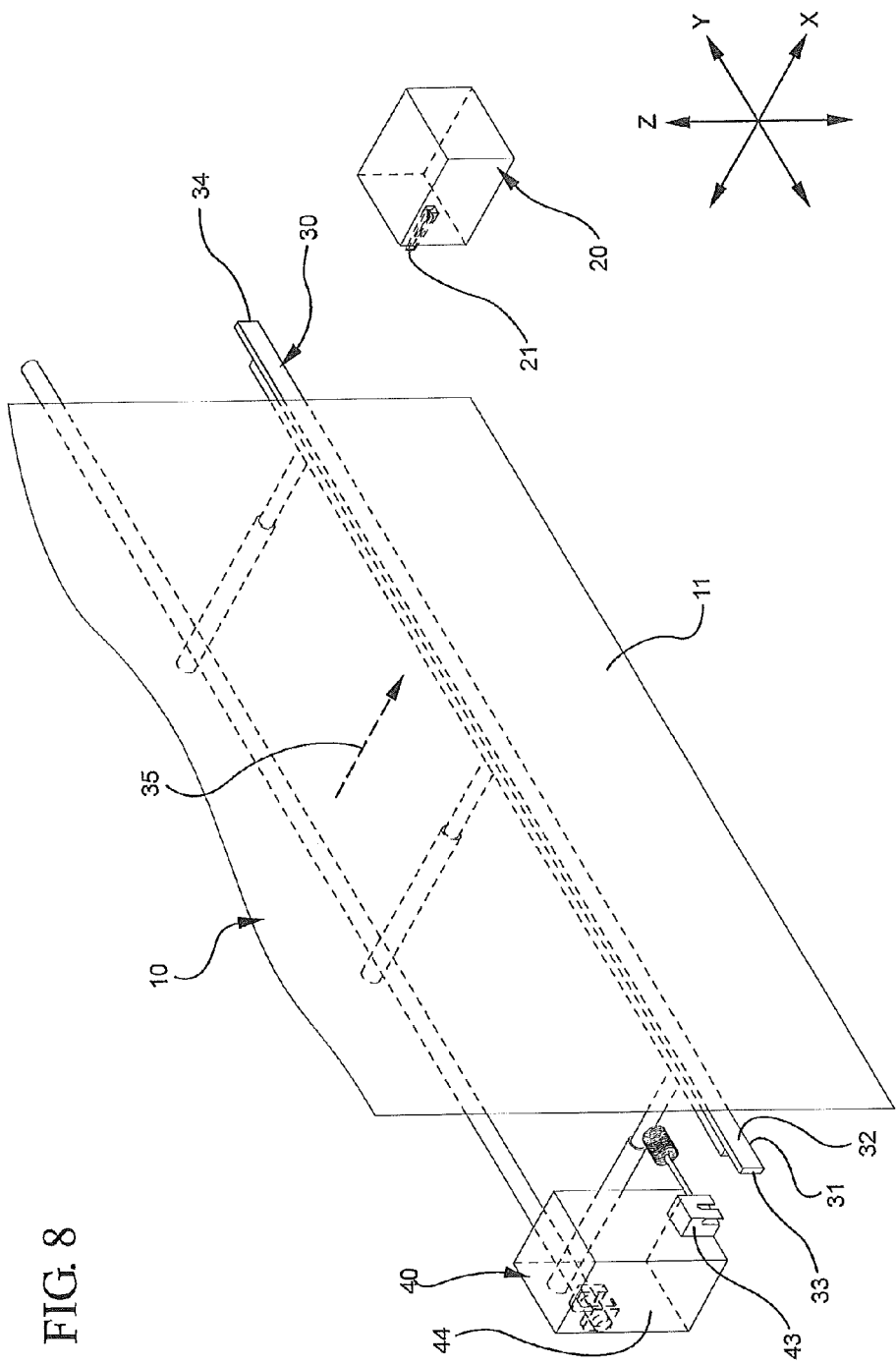
FIG. 8 is a schematic diagram illustrating the transition of a platen assembly from its rest state to its operative state.
Figure 9:
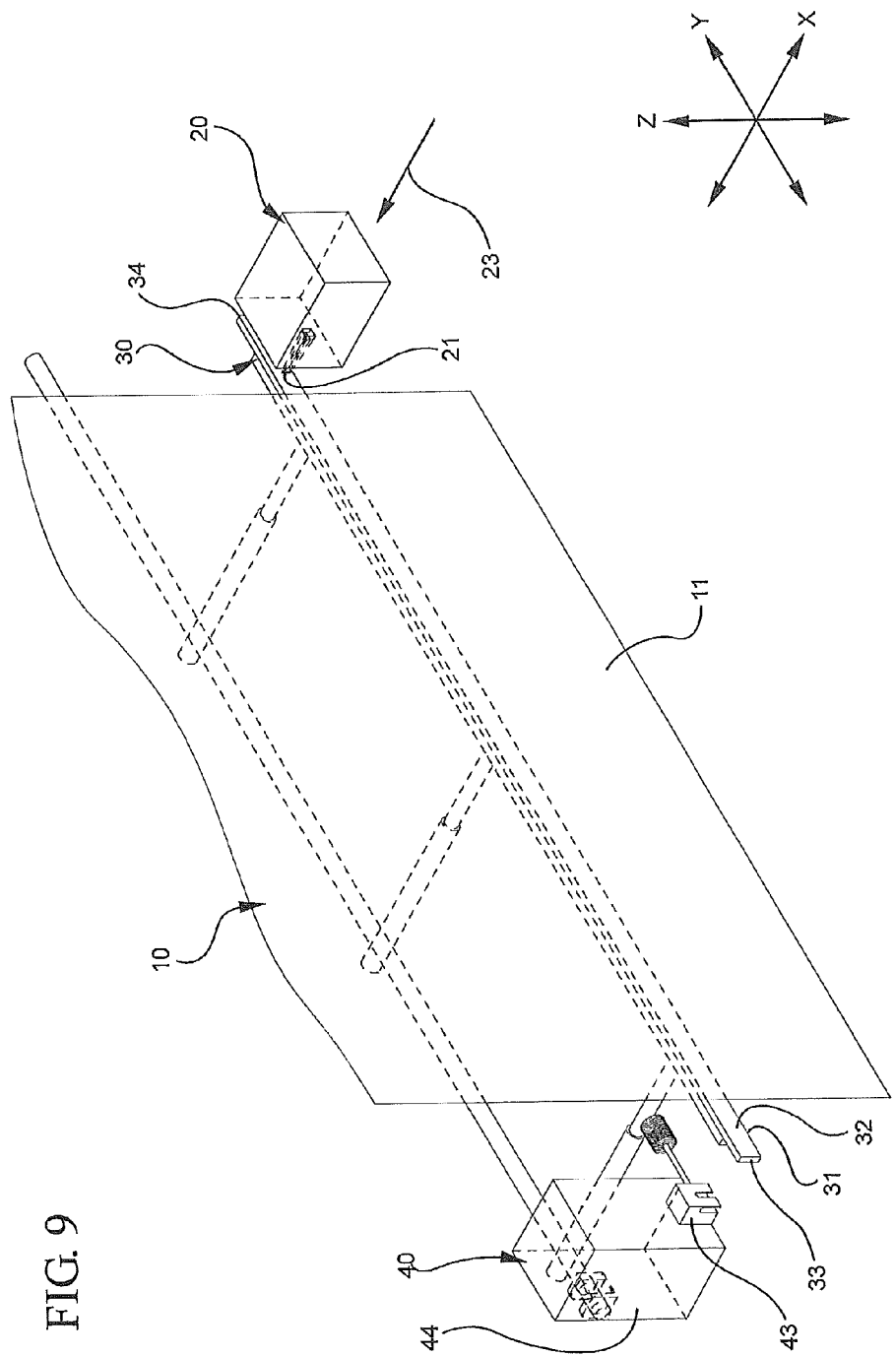
FIG. 9 is a schematic diagram illustrating the transition of a scoring assembly from its rest state to its operative state.

FIGS. 8 and 9 illustrate the transfer of the platen assembly and the scoring assembly from their rest states to their operative states. Thus, in FIG. 8, as illustrated by arrow 35, the platen has moved towards thin glass sheet 10 so that the platen's glass-engaging surface 32, e.g., its non-compliant, glass-engaging surface, has come into contact with the rear major surface of the sheet. In this way, the platen's glass-engaging surface can serve as an anvil for the scoring assembly's score head 21 during the formation of the vent.

The motion of platen 32 between its rest state of FIG. 7 and its operative state of FIG. 8 in the direction of arrow 35 defines a plane which is referred to herein as the "platen-plane-of-motion." In FIGS. 7 and 8, this plane corresponds to the x-y plane of the coordinate system shown in these figures. Although arrow 35 shows the platen moving towards the thin glass sheet, the sheet can also be moved towards the platen, e.g., when scoring individual sheets as opposed to a ribbon. A combination of glass and platen motions may also be useful in some cases. Whatever the motion, as seen from the thin glass sheet, the platen will move towards the sheet in the platen-plane-of-motion.

In FIG. 9, as illustrated by arrow 23, the scoring assembly has moved towards the thin glass sheet so as to bring the score head into contact with the front major surface of the sheet in preparation for the formation of vent 13 in that surface along a predetermined path, e.g., a straight line. In general, the platen makes contact with the thin glass sheet before the score head, although the opposite order or simultaneous contact may be useful in some cases.

Figure 10:
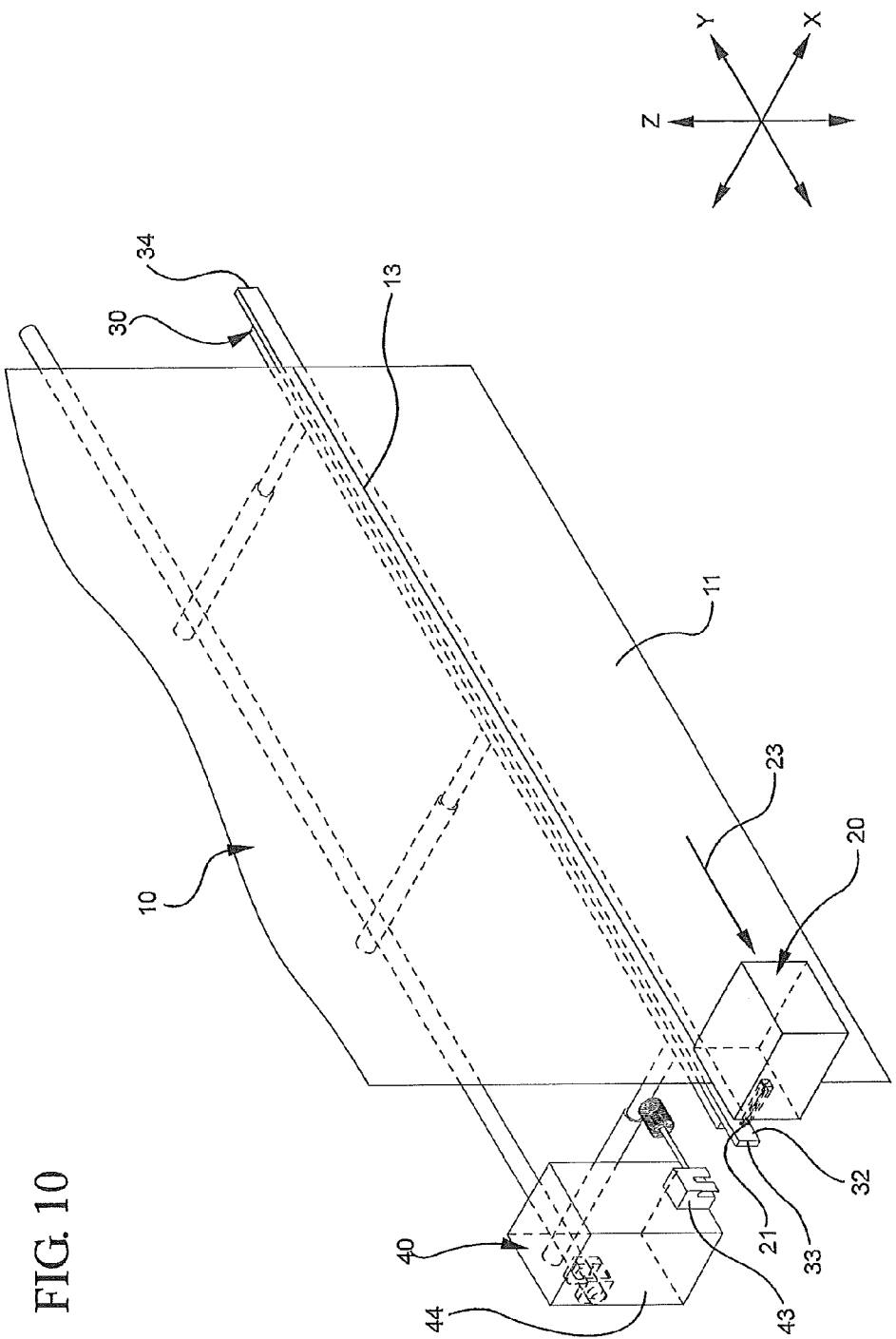
FIG. 10 is a schematic diagram illustrating the formation of a vent in a thin glass sheet by a scoring assembly.
Figure 11:
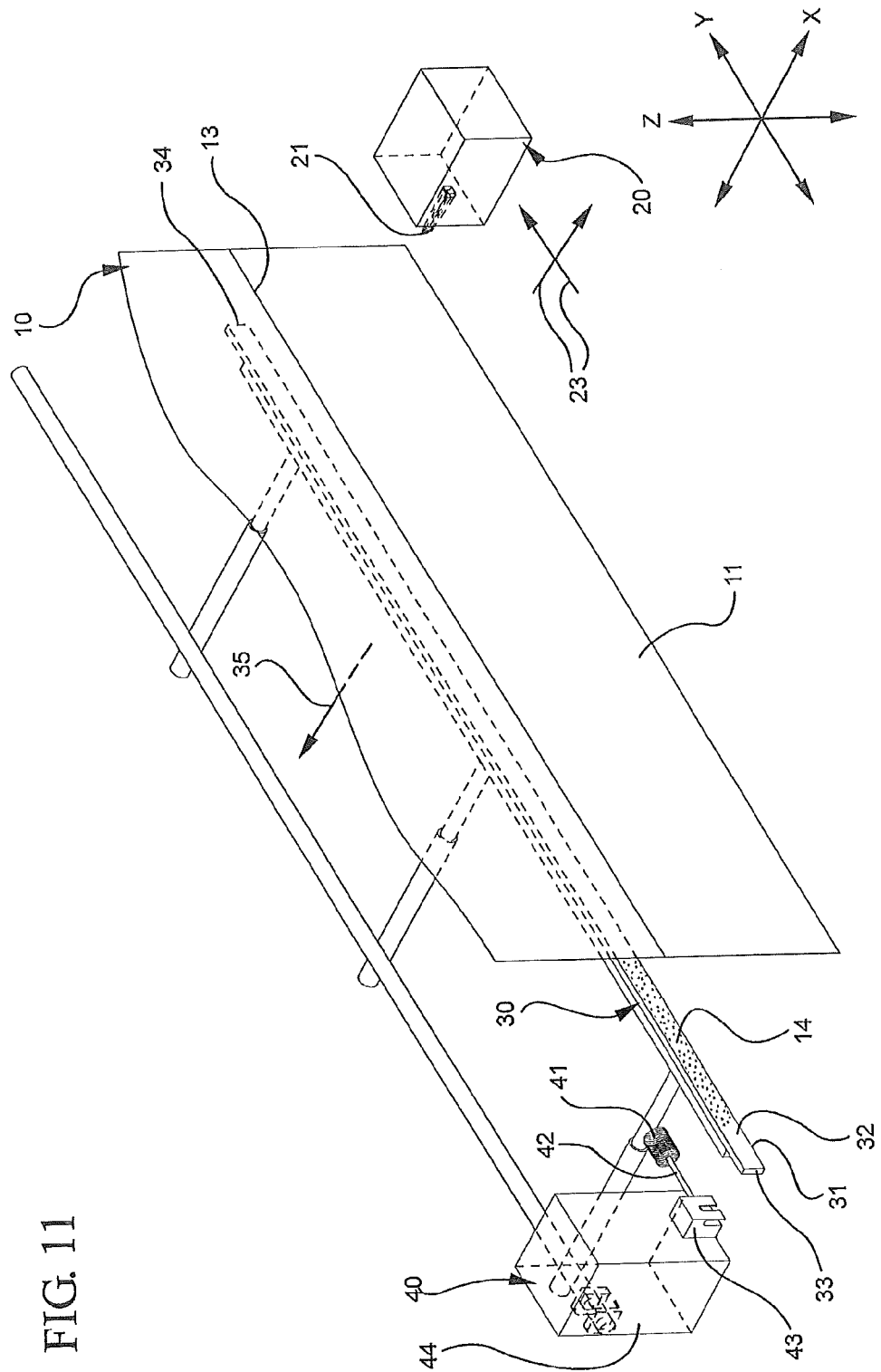
FIGS. 11 and 12 are schematic diagrams illustrating the transition of a platen assembly and a scoring assembly from their operative states to their rest states.
Figure 12:
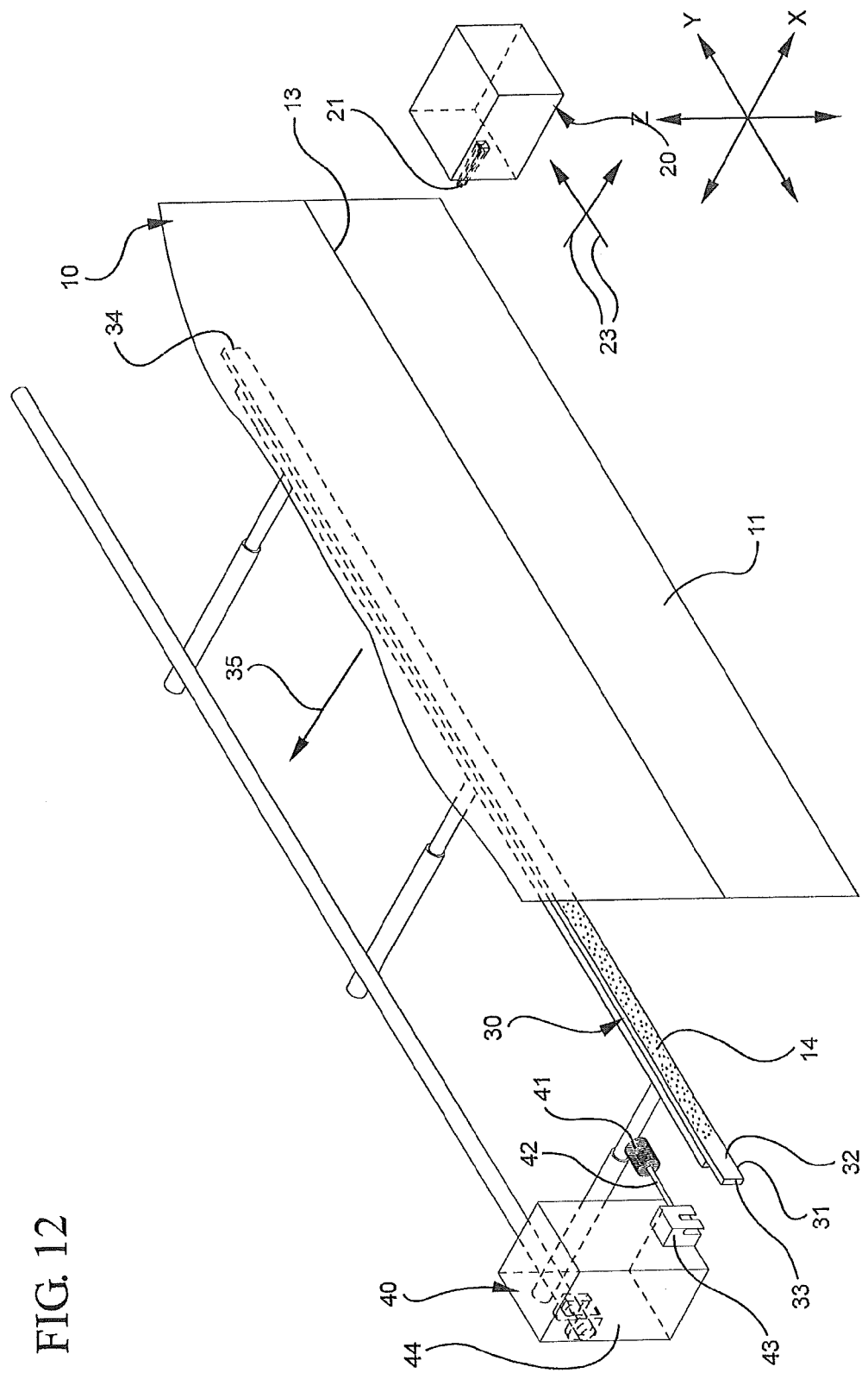
Figure 13:
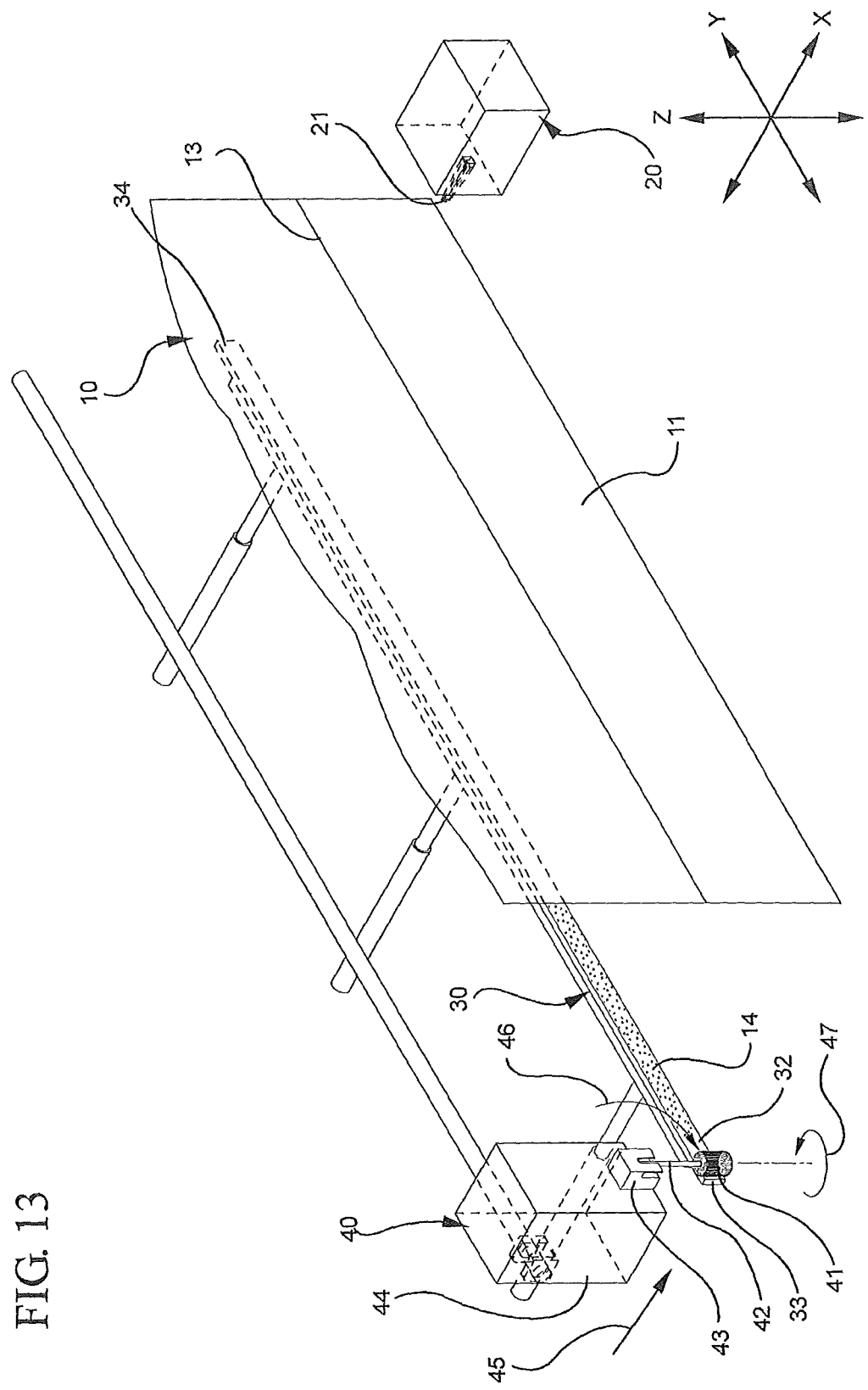
FIG. 13 is a schematic diagram illustrating the transition of a platen cleaning assembly from its rest state (specifically, the first of its rest positions) to its operative state.

The further motions of the scoring assembly are shown in FIGS. 10 through 13, namely, formation of vent 13 in FIG. 10 and the return of the scoring assembly to its rest state in FIGS. 11-13. In some cases, the scoring assembly can have two rest positions, one associated with the first end 33 of platen 31 and the other associated with the second end 34. In such a case, the scoring assembly would move away from the front major surface 11 of the thin glass sheet but would not traverse back across the width of the sheet in preparation for the next scoring cycle.

Also, in connection with the scoring of a moving glass sheet, e.g., a moving glass ribbon, the scoring and platen assemblies can move in synchrony with the glass ribbon during the formation of the vent, i.e., during the vent formation, these assemblies can be stationary relative to the moving glass sheet in the sheet's direction of motion. The platen cleaning assembly can also move with the scoring and platen assemblies during vent formation so that it will be in position to perform its cleaning function once the vent is completed. After the vent is completed, the assemblies can move upward so as to be in position to form another vent across the ribbon. To simplify the drawings, thin glass sheet 10 is assumed to be stationary in FIGS. 7-15. If the sheet were a moving ribbon, once formed, vent 13 would continually move downward while the assemblies would move upward to prepare for the formation of the next vent.

As shown in FIGS. 11 and 12, while scoring assembly 20 is returning to its rest state, so too is platen assembly 30. If desired, these motions can be separated in time, e.g., the scoring assembly can return to its rest state first, followed by the platen assembly, or vice versa.

The purpose of forming a vent in a glass sheet is, of course, to separate the sheet into two pieces through controlled cracking (see above). The separation can generate glass chips and thus operation of platen cleaning assembly 40 will normally not take place until the separation has occurred. The first step of the cleaning operation is illustrated in FIG. 13, where wiper 41 has been moved from its rest position of FIGS. 7-12 to its operative position. As shown in the figures, wiper 41 is a rotating brush. Other forms of wipers, e.g., stationary brushes, pads, etc., can be used if desired. The wiper needs to have sufficient mechanical strength to dislodge glass chips from the glass-engaging surface 32 of the platen. As noted above, glass chips can become electrostatically charged and thus can adhere tenaciously to surfaces they come into contact with. Accordingly, wiper 41 can be composed of strong materials that can apply substantial force to the glass-engaging surface, e.g., the wiper can be composed of high strength polymers (e.g., nylons) or steel fibers.

When a rotating brush is used, compressed air can be used as the motive force for turning the brush. Alternatively, the brush can be powered by an electrical motor. If desired, one or more vacuum bars (not shown) can be associated with platen 31 for collecting glass chips freed from the glass-engaging surface of the platen by the wiper, e.g., a vacuum bar can be placed above and/or below the platen and can extend along essentially the entire length of the platen. Also, localized vacuum can be applied to the wiper to capture the glass chips as they are being dislodged from the platen.

The transfer of wiper 41 from its rest position of FIGS. 7-12 to its operative state of FIG. 13 is performed by transfer assembly 43 which can be powered by, for example, compressed air or an electric motor. As shown in the figures, wiper 41 has an axis 42 (e.g., the axle of the rotating brush) which moves from a position where the axis is substantially parallel to the platen-plane-of-motion to a position where it is perpendicular to that plane. In this way, the wiper is out of interference with the movement of the platen during formation of vent 13 but is immediately close at hand to perform the cleaning process prior to the formation of the next vent.

Figure 14:
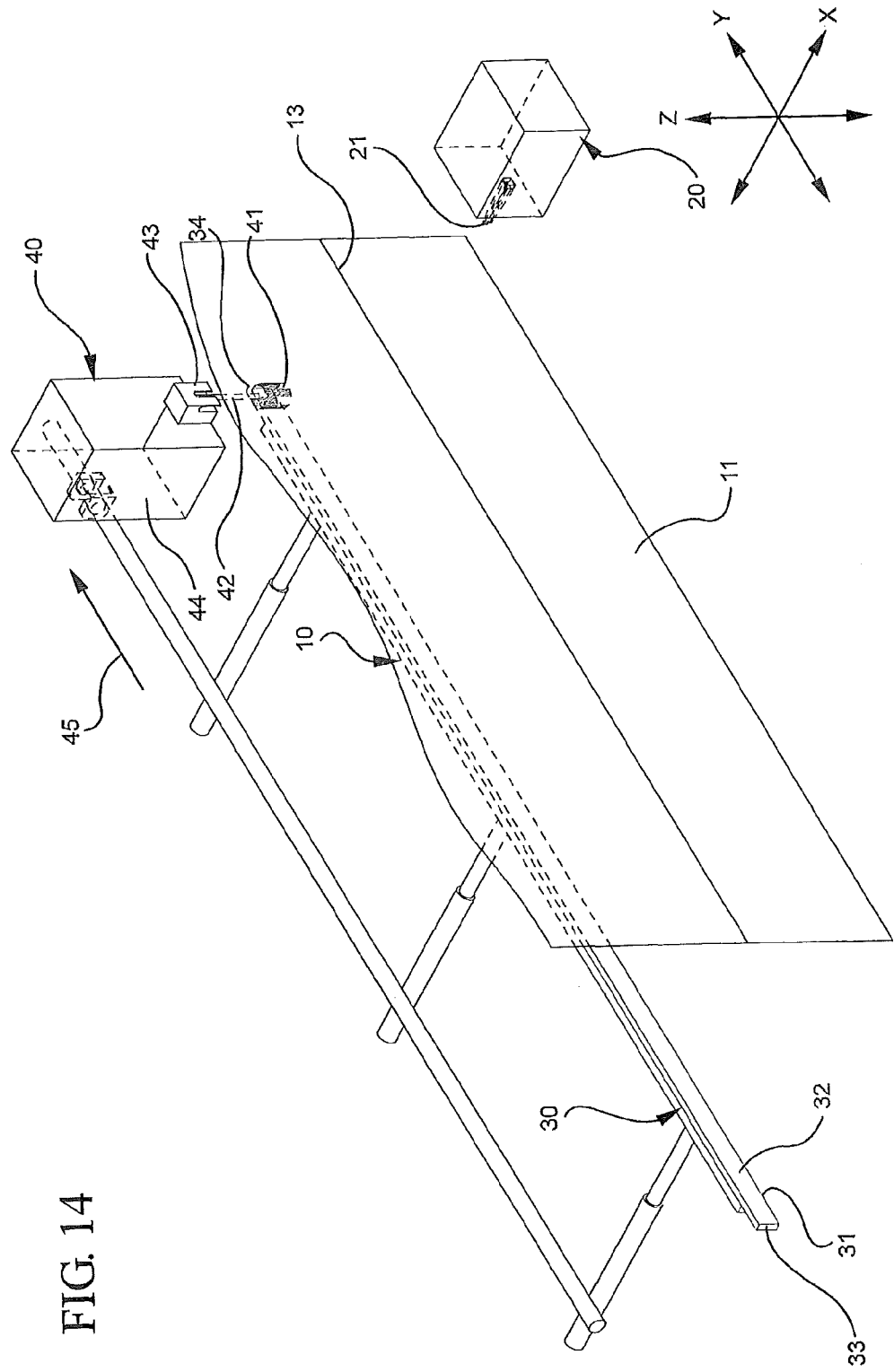
FIG. 14 is a schematic diagram illustrating cleaning of the glass-engaging surface of a platen by a platen cleaning assembly.

Once in its operative state, wiper 41 is moved across the glass-engaging surface of the platen using transport assembly 44 (see FIG. 14). The transport assembly can comprise, for example, a long rodless air cylinder, essentially the length of the platen. In the case of a wiper in the form of a brush, a rotary air cylinder can be mounted on the rodless air cylinder for rotating the brush. Other linear motion and rotary devices can be used if desired.

Figure 15:
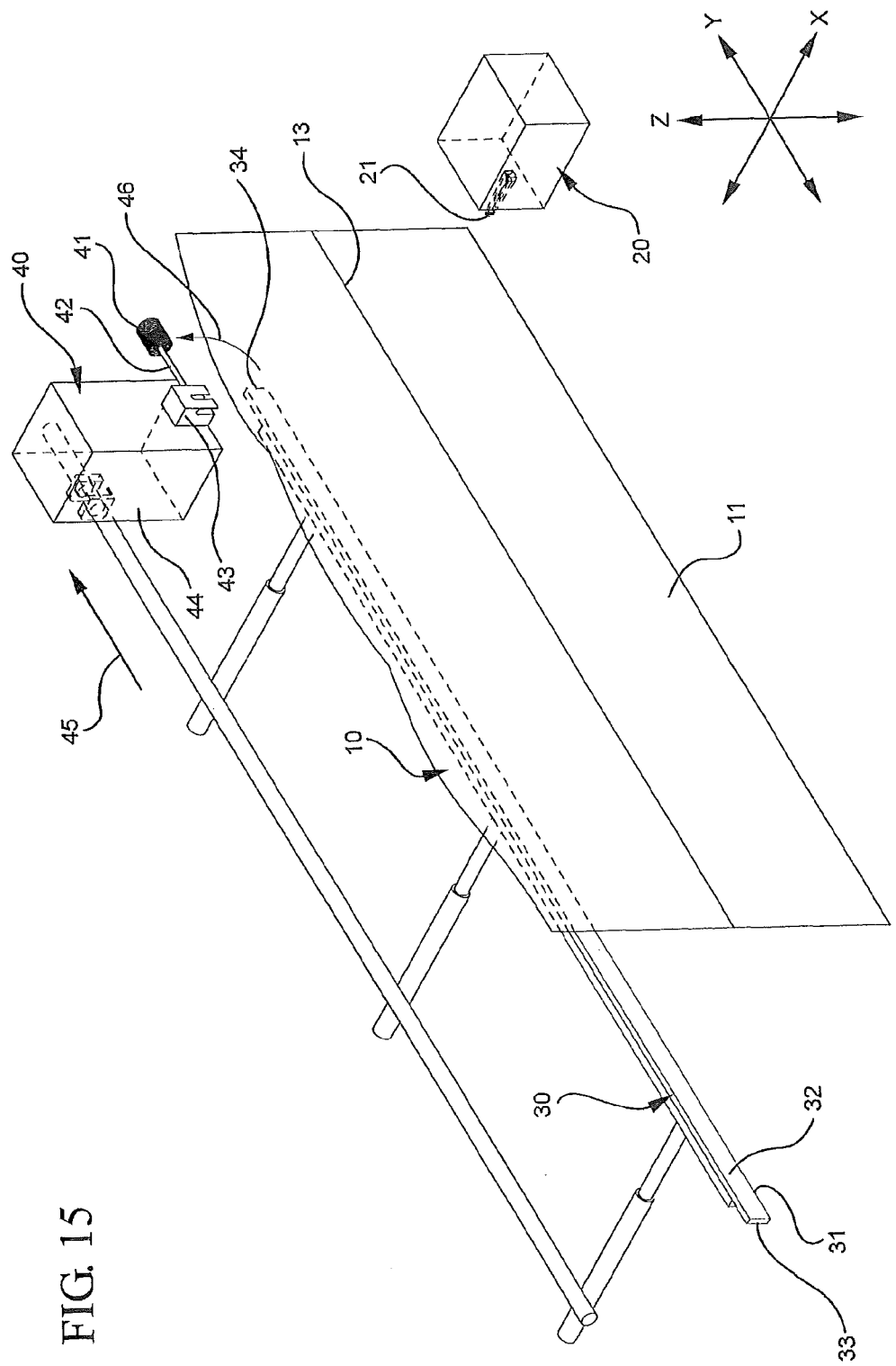
FIG. 15 is a schematic diagram illustrating the transition of a platen cleaning assembly from its operative state to its rest state (specifically, the second of its rest positions).

As shown in FIG. 15, after the glass-engaging surface of the platen has been cleaned, transfer assembly 43 returns wiper 41 to a position in which its axis is substantially parallel to the platen-plane-of-motion. If desired, the platen cleaning assembly can be returned to its initial position shown in FIG. 7. However, because cleaning the platen in opposite directions can be beneficial in terms of removing glass chips, the platen cleaning assembly can be left in its rest position shown in FIG. 15 and then transversed across the platen in the opposite direction at the end of the next scoring cycle, e.g., after the next separation of the glass sheet into two pieces.

Figure 16:
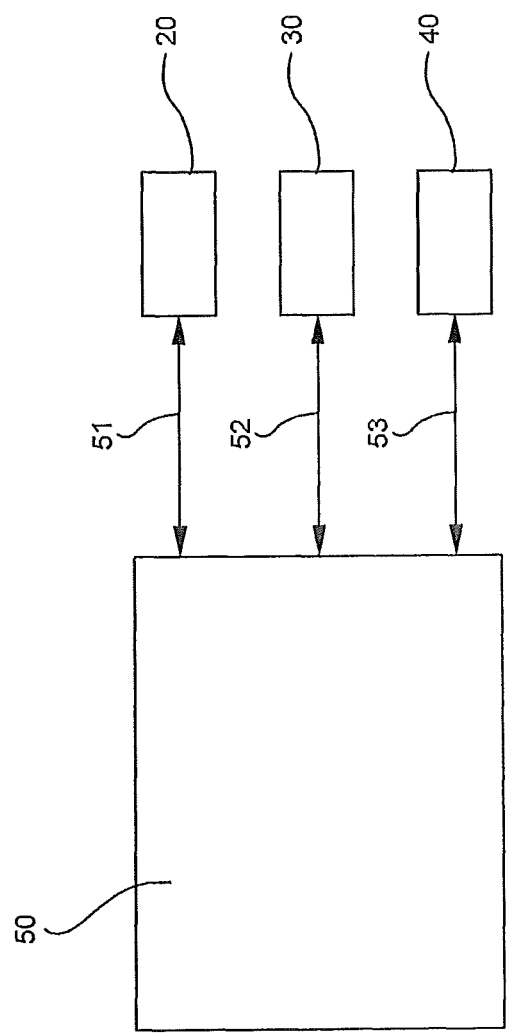
FIG. 16 is a schematic diagram illustrating a controller operatively connected to a scoring assembly, a platen assembly, and a platen cleaning assembly.

The various motions of the scoring, platen, and platen cleaning assemblies 20, 30, and 40 can be coordinated using a controller 50 which is operatively connected to the assemblies by two-way communication links 51, 52, and 53 (see FIG. 16). The controller can be a programmed general purpose computer or a dedicated computer control system programmed to perform scoring and platen cleaning. Additionally, limit switches can be used to avoid "crashes" between the various moving parts of the system.

As schematically illustrated in FIG. 17, through use of the system disclosed herein successful scoring can be achieved even with thin glass and without risk of a "death spiral." In addition to increasing yield, the system produces finished glass sheets having lower surface particle levels, which is of importance to manufacturers of handheld and other mobile electronic equipment.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. A method for forming vents in one or more glass sheets, each of which has a front major surface, a rear major surface, and a thickness ($\delta$), said method comprising repetitively:
   (I) bringing a score head and a platen into contact with, respectively, the front and rear major surfaces;
   (II) moving the score head across the front major surface along a predetermined path to form the vent, the platen serving as an anvil for the score head during the formation of the vent; and
   (III) withdrawing the score head and the platen from, respectively, the front and rear major surfaces;
   wherein:
   (a) the thickness ($\delta$) is less than or equal to 500 microns, and
   (b) for each repetition of steps (I) through (III), the platen is cleaned after step (III) and before step (I) to remove glass chips which if left on the platen could cause the score head to penetrate through the thickness ($\delta$).

2. The method of Claim 1 wherein the thickness ($\delta$) is less than or equal to 350 microns.

3. The method of Claim 1 wherein the one or more glass sheets comprises:
   (i) a glass ribbon and the repetition of steps (I) through (III) is performed in connection with the separation of individual glass sheets from the ribbon; or
   (ii) an individual glass sheet and the repetition of steps (I) through (III) is performed in connection with the formation of a plurality of vents in the individual glass sheet; or
   (iii) a series of individual glass sheets and the repetition of steps (I) through (III) is performed in connection with the formation of a vent in each of the individual glass sheets in the series.

4. The method of Claim 1 wherein the platen has a first end and a second end and the cleaning of the platen alternates between cleaning from the first end towards the second end and cleaning from the second end towards the first end.

5. The method of Claim 1 wherein the cleaning comprises contacting the platen with a rotating brush.

6. The method of Claim 5 wherein the cleaning comprises applying a vacuum to collect glass chips freed from the platen by the brush.

7. The method of Claim 5 wherein after step (III), the brush moves to a position where it engages the platen and before step (I), the brush moves to a position where it is out of engagement with the platen and will not interfere with steps (I) through (III).

8. The method of Claim 1 wherein at least the portion of the platen that engages the rear major surfaces of the glass sheets is made of steel and has a Rockwell hardness equal to or greater than 20.

9. Apparatus for forming a vent in a glass sheet which has front and rear major surfaces, said apparatus comprising:
  (I) a scoring assembly comprising a score head, said score head having a rest state and an operative state in which, during use of the apparatus, the score head contacts the front major surface of the glass sheet and forms a vent in that surface along a predetermined path;
  (II) a platen assembly comprising a platen having a non-compliant, glass-engaging surface, said platen having a rest state and an operative state in which, during use of the apparatus, the platen's non-compliant, glass-engaging surface contacts the rear major surface of the glass sheet and serves as an anvil for the score head during the formation of the vent;
  (III) a cleaning assembly comprising a wiper, said wiper having a rest state and an operative state in which, during use of the apparatus, the wiper contacts the non-compliant, glass-engaging surface of the platen and moves along that surface to remove glass chips that may be present on the surface; and
  (IV) a controller connected to the scoring, platen, and cleaning assemblies which during use of the apparatus:
  (A) transfers the score head and the platen from their rest states to their operative states to form the vent; and
  (B) once a vent has been formed:
    (i) transfers the score head and the platen from their operative states to their rest states; and
    (ii) transfers the wiper from its rest state to its operative state and back to its rest state.

10. The apparatus of Claim 9 wherein:
  (i) the platen has a first end and a second end;
  (ii) the wiper's rest state comprises a first rest position and a second rest position, the first rest position being associated with the first end of the platen and the second rest position being associated with the second end of the platen, the wiper being in its rest state when it is at either the first position or the second position; and
  (iii) the controller's transfer of the wiper from its rest state to its operative state and back to its rest state during use of the apparatus comprises either transferring the wiper from its first rest position to its operative state to its second rest position or transferring the wiper from its second rest position to its operative state to its first rest position.

11. The apparatus of Claim 10 wherein during use of the apparatus, the controller alternates between transferring the wiper from its first rest position to its operative state to its second rest position and transferring the wiper from its second rest position to its operative state to its first rest position.

12. The apparatus of Claim 9 wherein the score head comprises a scoring wheel or a scoring point.

13. The apparatus of Claim 9 wherein the platen's non-compliant, glass-engaging surface is made of steel and has a Rockwell hardness equal to or greater than 20.

14. The apparatus of Claim 9 wherein the wiper is a pad.

15. The apparatus of Claim 9 wherein the wiper is a rotating brush.

16. The apparatus of Claim 15 wherein the motion of the platen between its rest and operative states defines a plane and the rotating brush has an axle which is moveable between a first position where the axle is parallel to the plane and a second position where the axle is perpendicular to the plane, the rotating brush being, respectively, in its rest and operative states when the axle is in its first and second positions.

17. Apparatus for use in forming a vent in a glass sheet comprising:
  (I) a platen having a non-compliant surface which, during use of the apparatus, contacts a major surface of the glass sheet and serves as an anvil for a score head which forms a vent in the glass sheet; wherein the non-compliant surface is made of steel and has a Rockwell hardness equal to or greater than 20;
  (II) a transport assembly for the platen which, during use of the apparatus, moves the platen in a platen-plane-of-motion between a rest state and an operative state; and
  (III) a platen cleaning assembly which comprises:
    (a) a wiper which has a rest state and an operative state, the wiper being out of the platen-plane-of-motion when the wiper is in its rest state and intersecting the platen-plane-of-motion when the wiper is in its operative state;
    (b) a transfer assembly which, during use of the apparatus, transfers the wiper between its rest and operative states; and
    (c) a transport assembly which, during use of the apparatus, moves the wiper along the platen to remove glass chips that may be present on the surface of the platen.

18. The apparatus of Claim 17 wherein the wiper is a pad.

19. The apparatus of Claim 17 wherein the wiper is a rotating brush.

20. A method of forming a glass sheet comprising producing a glass sheet and forming vents in the glass sheet according to the method of claim 1.

* * * * *